United States Patent Office 3,592,927
Patented July 13, 1971

3,592,927
PRODUCTION OF CALCIUM PANTOTHENATE COMPOSITIONS
Maximilian Koffler, Tel Aviv, and Zdzislaw B. Krawczak, Jerusalem, Israel, assignors to Koffolk Chemical Works Ltd., Jerusalem, Israel
No Drawing. Continuation of abandoned application Ser. No. 665,243, Sept. 5, 1967. This application Mar. 17, 1970, Ser. No. 20,385
Int. Cl. A61k 27/00
U.S. Cl. 424—184      2 Claims

ABSTRACT OF THE DISCLOSURE

A calcium pantothenate composition comprising a hydrophobic silicium oxide compound in an amount not exceeding 5% by weight of the calcium pantothenate.

The composition is prepared in a continuous operation in which calcium oxide is first reacted with β-alanine, the resulting calcium β-alanate is reacted without isolation with α-hydroxy-β,β-dimethyl γ-butyrolactone and a hydrophobic silicium oxide compound is then incorporated.

---

This is a continuing application of copending parent application Ser. No. 665,243 filed Sept. 5, 1967 now abandoned without prejudice in favor of the present application.

The present invention concerns a calcium pantothenate composition and a method for its preparation.

Calcium pantothenate has vitamin activity and is used in human and veterinary medicine. According to one known method, calcium pantothenate is prepared by reacting calcium β-alanate with α-hydroxy-β,β-dimethyl-γ-butyrolactone. Attempts to prepare the calcium pantothenate in one continuous sequence of operations by reacting first calcium oxide with β-alanine and then reacting the resulting calcium β-alanate, without isolation, with the above lactone have failed since the water which is liberated during the reaction between calcium oxide and alanine hampers the isolation of the hygroscopic final product in a free flowing, crystalline form. However, the two-step operation according to which calcium β-alanate has first to be isolated (it may alternatively be purchased as a commercial product) is inconvenient and expensive.

It has therefore been proposed to proceed by a different method in that in a first step calcium-β-alanate is prepared from β-alanine and metallic calcium and the resulting calcium β-alanate is then reacted, without isolation, with α-hydroxy-β,β-dimethyl-γ-butyrolactone. However, this method requires the use of metallic calcium which is inconvenient, in particular when operating on an industrial scale.

By a third method which has also been proposed calcium panthothenate is prepared in one continuous sequence of operations by first reacting calcium oxide with β-alanine and then reacting the resulting calcium β-alanate, without isolation, with α-hydroxy-β,β-dimethyl-γ-butyrolactone, and calcium chloride is incorporated after completion of the reaction before the isolation of the product in an equimolecular amount, to yield the complex $CaCl_2 \cdot Ca$-pantothenate. This complex contains approximately 18% by weight of calcium chloride and while it may be used for veterinary medicine, it is inadequate for human medicine.

In accordance with the present invention it has surprisingly been found that calcium pantothenate resulting from a continuous sequence of operations comprising first reacting calcium oxide with β-alanine and then, without prior isolation, reacting the resulting calcium β-alanate with α-hydroxy-β,β-dimethyl γ-butyrolactone, can be obtained in a free flowing crystalline form if a silicium oxide compound is admixed to the product in an amount not exceeding 5% by weight of the product.

In this specification the term "silicium oxide compound" designates $SiO_2$. The silicium oxide compound may alternatively be a modified silica such as one modified with methyl groups. Regardless, the silicium oxide should be finely divided of surface area at least about 100 m.$^2$/g.

Consequently, the invention consists in a calcium pantothenate composition comprising a silicium oxide compound in an amount not exceeding 5% by weight of the calcium pantothenate. The minimum quantity to be effective to provide a dry and free-flowing product will generally be on the order of 1% by weight.

The invention also provides a process for the preparation of the above composition comprising reacting calcium oxide with β-alanine, reacting the resulting calcium β-alanate, without isolation, with α-hydroxy-β,β-dimethyl-γ-butyrolactone, incorporating a silicium oxide compound in the reaction mixture in an amount not exceeding 5% by weight of the product calcium pantothenate, and recovering a calcium pantothenate-silicium oxide compound composition from the reaction mixture.

The resulting composition is crystalline and free flowing.
The invention applies both to d-calcium pantothenate, as well as to d,l-calcium pantothenate.

The invention is illustrated by the following example without being limited thereto:

EXAMPLE 150 parts of β-alanine were suspended in 450 parts of commercial methanol. To this mixture were added 48 parts of fine ground calcium oxide in small portions, maintaining the temperature between 40–45° C., during 30 minutes. The reaction mixture was stirred for 30 minutes more, and then 309 parts of a 70% methanolic solution of d,l-α-hydroxy-β,β-dimethyl-γ-butyrolactone were added and the reaction mixture was refluxed for two hours. The reaction mixture was then cooled, and 4½ parts of a silicium oxide compound were added. The mixture was then stirred for 15 minutes and dried in vacuo.

A foam-like product was collected and ground. It is a very dry, non-cohesive, free-flowing powder, showing all the characteristics of the racemic calcium pantothenate.

The silicium oxide compounds used in the present invention have included a pure amorphous hydrophilic silica powder (>99.8% $SiO_2$) of average particle size 15 mμ and surface area 175±25 m.$^2$/g.; an amorphous hydrophobic methylated silica (>99.8% $SiO_2$+—$CH_3$) of average particle size 20 mμ and surface area BET 150±30 m.$^2$/g.

In an analogous manner d-calcium pantothenate can be prepared from d-α-hydroxy-β,β-dimethyl-γ-butyrolactone.

The product according to the invention which contains only up to 5% of silicium oxide is safe for human consumption. It is favorably distinguished from the $CaCl_2 \cdot Ca$-pantothenate complex referred to above, in that it contains only up to 5% by weight of an inert compound as compared to 18% by weight of calcium chloride in the above complex. Moreover, while the silicium oxide, in particular in such small quantities, is completely inert to the human body, calcium chloride is not and may produce some undesired side effects even in animals.

It will be obvious to those skilled in the art that various changes may be made without departing from the scope of the invention and the invention is not to be considered limited to what is described in the specification.

What is claimed is:
1. Process for the preparation of a calcium pantothenate composition comprising slowly adding calcium oxide to β-alanine to form calcium β-alanate; then adding to the calcium β-alanate reaction medium, without isolation, α-hydroxy-β,β-dimethyl γ-butyrolactone to form calcium pantothenate reaction mixture; incorporating finely divided silicium oxide in the Ca pantothenate reaction mixture, in an effective amount to produce a dry and free-flowing product, not exceeding 5% by weight of the product calcium pantothenate; and drying the reaction mixture to recover a calcium pantothenate-silicium oxide compound composition of not more than 5% silicium oxide with the remainder being calcium pantothenate.

2. A calcium pantothenate composition prepared by a process according to claim 1.

References Cited
UNITED STATES PATENTS

| | | | |
|---|---|---|---|
| 2,846,352 | 8/1958 | Bryant | 424—319 |
| 2,918,370 | 12/1959 | Helgren | 424—319 |
| 2,957,025 | 10/1960 | Brooks | 424—319 |
| 3,247,064 | 4/1966 | Maekowa et al. | 424—319 |

STANLEY J. FRIEDMAN, Primary Examiner

U.S. Cl. X.R.

424—319